2,928,132
METHOD OF PRODUCING HEAT-SHRINKABLE POLYETHYLENE TEREPHTHALATE FILM

Robert Laurence Richards, Jr., Kenmore, N.Y., assignor to E. I. du Pont de Nemours and Company, Wilmington, Del., a corporation of Delaware No Drawing. Application December 31, 1957
Serial No. 706,247

5 Claims. (Cl. 18—48)

This invention relates to heat-shrinkable film of synthetic linear polyester, and more particularly to the production of biaxially oriented, heat-shrinkable polyethylene terephthalate film having substantially the same degree of shrinkage in both directions of the film.

There are numerous synthetic linear organic polymers such as polyethylene terephthalate which are capable of being formed into translucent or transparent films having excellent physical properties. Certain of these properties such as tensile strength, impact strength, flex life, etc., may be further enhanced by the process of orientation. Thus, biaxially oriented polyethylene terephthalate film, e.g., film which has been stretched to substantially the same extent in both directions, i.e., the amount of stretch in the first direction divided by the amount of stretch in the second direction=1, is a highly versatile material because of its relatively balanced physical properties, excellent electrical properties and outstanding resistance to chemical degradation. The film when heat-set at elevated temperatures (180–200° C.) exhibits a high degree of dimensional stability and resistance to shrinkage at elevated temperatures up to the heat-sealing temperature. However, polyethylene terephthalate film oriented by stretching to substantially the same extent in both directions exhibits a substantially greater degree of shrinkage in the second direction of stretch. For example, a polyethylene terephthalate film oriented by stretching to an extent of 3 times its initial dimensions in both directions and heat-set at 85° C. exhibits a shrinkage of approximately 30% in the first direction of stretch and 46% in the second direction (mutually perpendicular to the first direction of stretch). This unbalanced shrinkage ratio is of great disadvantage for certain packaging uses wherein a greater degree of balance of shrinkage patterns is a prerequisite.

By the term "shrink" or "shrinkage" as used is meant the amount the film contracts in one or both directions when immersed in boiling water (100° C.) under substantially no tension. By the term "balanced shrinkage" is meant the film shrinks to the same extent in either direction within the limits of experimental error in measurement (±5%). By the term "heat-setting temperature" is meant the ambient temperature (temperature of the atmosphere immediately surrounding the film) to which the film is subjected while under tension, and not the actual temperature of the film itself.

A principal object of this invention, therefore, is to provide a heat-shrinkable, biaxially oriented polyethylene terephthalate film having substantially the same degree of shrinkage in both directions of the film. A further object is to provide a process for producing a heat-shrinkable, biaxially oriented polyethylene terephthalate film having substantially balanced shrinkage characteristics. Still another object is to provide a heat-shrinkable, biaxially oriented polyethylene terephthalate film having substantially the same degree of shrinkage in both directions, and being substantially dimensionally stable at temperatures below about 85° C. These and other objects will more clearly appear hereinafter.

The foregoing objects are realized by the present invention which, briefly stated, comprises stretching substantially amorphous polyethylene terephthalate film first in one direction and thereafter in a second direction perpendicular to the first direction to an extent such that the final film thickness is reduced to approximately ⅑ the original thickness of the film (the thickness of the film prior to stretching), the film being stretched to a lesser amount in the first direction such that the ratio of the amount of stretch in the first direction to the amount of stretch in the second direction is equal to a value within the range of from 0.65 to 0.75. The resulting biaxially oriented film exhibits substantially the same degree of shrinkage in both directions, as well as the improved physical and chemical properties inherent in oriented film.

The preferred subject for treatment in accordance with the process of this invention is film formed from polyethylene terephthalate, as described in U.S. Patent Number 2,465,319 to Whinfield and Dickson. Polyethylene terephthalate may be prepared by the condensation of ethylene glycol and terephthalic acid, or preferably by carrying out an ester interchange reaction between ethylene glycol and dialkyl ester terephthalic acid, e.g., dimethyl terephthalate. Films of polyethylene terephthalate may be prepared by extruding the molten polymer through a narrow orifice and chilling the polymer in film form.

It is to be understood, however, that the present invention comprehends films of any synthetic linear terephthalic ester polymer derived by reacting a glycol selected from the series $HO(CH_2)_nOH$ where $n$ is an integer from 2–10 inclusive, terephthalic acid, or ester-forming derivatives thereof, or low molecular weight esters thereof, and from 0–20% by weight of a second acid or ester thereof; said second acid being selected from such acids as isophthalic acids, bibenzoic acid, naphthalic acid, 2,5-dimethyl terephthalic acid, and bis-p-carboxy phenoxy ethane.

As mentioned above, polyethylene terephthalate oriented by stretching to substantially the same extent in both directions exhibits a substantially greater degree of shrinkage in the second direction of stretch. Inasmuch as film shrinkage normally increases with an increase in the degree of stretch, one skilled in the art would expect that in order to produce a balanced film with respect to shrinkage it would be necessary to stretch the film to a greater extent in the first direction than in the second direction of stretch. Unexpectedly it has been discovered that if, in orienting polyethylene terephthalate and like polyester film by stretching the film in both directions such that the thickness is reduced to approximately ¼–⅑ its original thickness, the film is stretched to a lesser degree in the first direction of stretch than in the second direction, an oriented polyethylene terephthalate film having substantially balanced shrinkage results. For reduction of film thickness to a value less than ⅑ the original thickness of the film (the thickness of the film prior to stretching) but not less than ¼, e.g., for reduction to, say, ⅐ or ⅛, the ratio of the amount of stretch in the first direction to the amount of stretch in the second direction will be influenced by the speed at which the film is stretched. With total reductions in thickness of ⅑, however, regardless of the speed at which the film is stretched, the film will possess substantially balanced shrinkage patterns if a stretch ratio of 0.65 to 0.75 is utilized. The level of shrinkage will, of course, be controlled by the temperature at which the film is heat-set and the speed at which the film is stretched. Because of the commercial importance of such films, this application will concern itself mainly with the production of polyethylene terephthalate films from substantially amorphous polyethylene terephthalate having approximately ⅑ the original thickness of the film which exhibits a substantial degree of balanced shrinkage in both directons of the film.

Polyethylene terephthalate films prepared as described above (total reduction in thickness of approximately ⅑) also unexpectedly, in addition to exhibiting substantial balanced shrinkage in either direction, possess enhanced physical properties comparable with those of a film stretched 3 times its original dimensions in both directions.

The optimum temperature at which the film is stretched will generally fall within the range of from 70°–105° C., and, in the preferred embodiment of the invention, the film after stretching is heat-set at a heat-setting temperature of from 85°–100° C. while maintaining the film under sufficient tension (during the heat-set interval and subsequent cooling), to prevent shrinkage during the heat-setting operation. This latter step insures a film having dimensional stability below the heat-shrinking temperature defined hereinabove. As stated previously, the total stretch imposed on the film will be such as to reduce the film to a final thickness of approximately ⅑ the thickness of the film prior to stretching in the first direction. Preferably, the film is stretched to about 2.5X, where X signifies the original dimension of the film, in the first direction and to an extent of about 3.7X in the second direction, at temperatures within the range of 70°–105° C., and heat-set under restraint at 85°–100° C.

The film may be stretched by any conventional stretching means known to the art. It may be stretched to a lesser extent first in either the longitudinal or transverse direction. In the examples to follow, however, it was found to be more advantageous because of the type of equipment employed, to stretch the film to the lesser extent in the direction in which it was cast (longitudinal or machine direction hereinafter denoted by the symbol MD), followed by stretching to the greater amount in the direction perpendicular to this direction (transverse direction hereinafter denoted by the symbol TD).

The following examples will serve to further illustrate the principles and practice of this invention:

EXAMPLE 1

Substantially amorphous as-cast polyethylene terephthalate film was stretched in both directions in a stretching apparatus more fully described in Scarlett U.S. application Serial No. 287,354 (filed May 12, 1952), now Patent No. 2,823,421, at a film speed of 20 yards per minute. The film was stretched first to the extent of 2.6 times the original length of the film in the longitudinal direction and then to an extent of 3.5 times the original width in the transverse direction (MD to TD ratio of 0.74) at temperatures of 80°–85° C. The film was heat-set under restraint at 85° C. The shrinkage of the film was measured as follows:

The stretched, heat-set film was cut into test samples measuring 5" x 5", two edges being parallel in the longitudinal direction and two being parallel in the transverse direction. The samples were grasped near the center by a pair of forceps and immersed in a beaker of boiling water (100° C.). After 30 seconds the samples were removed and mopped dry with a paper towel. The dimensions of the square sample were measured to determine the amount of shrinkage in each direction. Three samples were run, and an average of the shrinkage of the three samples was taken as the recorded shrinkage of the film.

In this case, the average shrinkage was 27% in each direction.

EXAMPLE 2

In a similar manner to that described in Example 1, substantially amorphous polyethylene terephthalate film was stretched in both directions at temperatures of 80°–90° C. The stretch ratios (MD/TD) and the film speeds were varied; as hereinafter indicated, the total stretch in each instance being such that the thickness of the film was reduced to ⅑ of its original value. The film was heat-set under restraint at the indicated temperatures. The film was tested at 100° C. for shrinkage in the manner described hereinbefore. Table I, below, lists the stretch ratio and the precent shrinkage of the film in both directions at film stretching speeds of 20, 50 and 80 yards per minute.

From Table I it can be seen that when the final film thickness is reduced to about ⅑ the original thickness, and the MD to TD stretch ratio is 0.65 to 0.75, a film is produced having substantially balanced shrinkage in both directions irrespective of film speed. The level of shrinkage is determined by two factors: the film speed and the temperature at which the film is heat-set.

Table II, below, listing the heat-setting temperature, the density, percent crystallinity of the film and percent shrinkage in both the longitudinal and transverse directions at film speeds of 20, 50 and 80 yards per minute, illustrates the effect of heat-setting temperature and film speed of a film which has been stretched in both directions to a total reduction in thickness to ⅑ the original thickness, wherein the MD to TD ratio falling within the defined limits of 0.65 to 0.75 has been utilized. (In this case a 2.5X stretch in the longitudinal direction and a 3.7X stretch in the transverse direction.)

*Table I*

EFFECT OF STRETCH RATIO ON FILM SHRINKAGE TOTAL REDUCTION IN FILM THICKNESS=9X STRETCHING TEMPERATURES=80–85° C.

| Stretch Ratio | | | Percent Shrinkage at Speeds of— | | | | | | | | |
|---|---|---|---|---|---|---|---|---|---|---|---|
| | | | 20 Yds. per Min.[1] | | | 50 Yds. per Min.[2] | | | 80 Yds. per Min.[3] | | |
| MD | TD | MD/TD | MD | TD | MD/TD | MD | TD | MD/TD | MD | TD | MD/TD |
| 2.5 | 3.7 | 0.68 | 26 | 23 | 1.12 | 31 | 35 | 0.9 | 37 | 37 | 1.10 |
| 3.0 | 3.0 | 1.0 | 30 | 46 | 0.65 | 33 | 49 | 0.68 | 36 | 53 | 0.68 |
| 3.5 | 2.6 | 1.35 | 31 | 61 | 0.51 | 33 | 62 | 0.53 | 31 | 59 | 0.52 |
| 4.0 | 2.3 | 1.78 | 32 | 59 | 0.55 | | | | | | |

[1] Film heat-set at temperature of 85° C. for 20 seconds.
[2] Film heat-set at temperature of 85° C. for 8 seconds.
[3] Film heat-set at temperature of 85° C. for 5 seconds.

Table II

EFFECT OF CRYSTALLINITY ON FILM SHRINKAGE OF A FILM STRETCHED 2.5X MD BY 3.7X TD, AT TEMPERATURES OF 80-85° C. AND HEAT-SET FOR ONE MINUTE AT TABULATED TEMPERATURES

| Temperature, °C. | Film Speed | | | | | | | | | | | |
|---|---|---|---|---|---|---|---|---|---|---|---|---|
| | 20 yards per Minute | | | | 50 Yards per Minute | | | | 80 Yards per Minute | | | |
| | Density | Percent Crystallinity | Shrinkage | | Density | Percent Crystallinity | Shrinkage | | Density | Percent Crystallinity | Shrinkage | |
| | | | MD | TD | | | MD | TD | | | MD | TD |
| 85 | 1.3504 | 14.6 | 26 | 23 | 1.3481 | 12.9 | 31 | 35 | 1.3481 | 12.9 | 37 | 37 |
| 90 | 1.3537 | 16.9 | 22 | 19 | 1.3561 | 18.6 | 19 | 16 | 1.3550 | 17.9 | 22 | 20 |
| 95 | | | | | 1.3568 | 19.1 | 16 | 12 | 1.3570 | 19.3 | 15 | 12 |
| 100 | 1.3589 | 20.6 | 10 | 7 | 1.3593 | 20.9 | 12 | 9 | 1.3587 | 20.5 | 12 | 10 |

From Table II it can be seen that as the film speed is increased, the level of shrinkage increases. Conversely, the higher the heat-setting temperature and the higher the percent of crystallinity of the film, the lower the level of shrinkage. The balance obtained by stretching at the above-mentioned MD to TD stretch ratios, however, is substantially unaffected by changes in heat-setting temperature and film speed.

The present invention not only presents a highly successful method for the production of a heat-shrinkable polyethylene terephthalate film which exhibits a substantially balanced two-directional shrinkage, but also effectively provides a method for controlling the degree of shrinkage at any desired level. Such a film has a great potential market both in the food packaging field and other types of industrial packaging. A film with balanced shrinkage is particularly useful in applications where skin-fitting is necessary. Films which do not shrink to substantially the same degree in both directions present a heat-sealing problem in that they are more difficult to seal, and they are also less adaptable to formation of bags in standard bag machines.

I claim:

1. A process for forming biaxially oriented, heat-shrinkable polyethylene terephthalate film exhibiting substantially the same degree of shrinkage in both directions of the film which comprises stretching substantially amorphous polyethylene terephthalate film first in one direction and thereafter in a second direction perpendicular to the first direction to an extent such that the final film thickness is approximately one-ninth of the thickness of the film prior to stretching, the film being stretched to a lesser amount in the first direction such that the ratio of the amount of stretch in the first direction to the amount of stretch in the second direction is equal to a value within the range of from 0.65 to 0.75.

2. A process for forming biaxially oriented, heat-shrinkable polyethylene terephthalate film exhibiting substantially the same degree of shrinkage in both directions of the film which comprises stretching substantially amorphous polyethylene terephthalate film at a temperature within the range of from 70°–105° C., first in one direction and thereafter in a second direction perpendicular to the first direction to an extent such that the final film thickness is approximately one-ninth of the thickness of the film prior to stretching, the film being stretched to a lesser amount in the first direction such that the ratio of the amount of stretch in the first direction to the amount of stretch in the second direction is equal to a value within the range of from 0.65 to 0.75.

3. A process for forming biaxially oriented, heat-shrinkable polyethylene terephthalate film exhibiting substantially the same degree of shrinkage in both directions of the film which comprises stretching substantially amorphous polyethylene terephthalate film first in one direction and thereafter in a second direction perpendicular to the first direction to an extent such that the final film thickness is approximately one-ninth of the thickness of the film prior to stretching, the film being stretched to a lesser amount in the first direction such that the ratio of the amount of stretch in the first direction to the amount of stretch in the second direction is equal to a value within the range of from 0.65 to 0.75, and thereafter heat-setting the resulting stretched film at a temperature of from 85°–100° C. while maintaining the film under tension.

4. A process for forming biaxially oriented, heat-shrinkable polyethylene terephthalate film exhibiting substantially the same degree of shrinkage in both directions of the film which comprises stretching substantially amorphous polyethylene terephthalate film at a temperature within the range of from 70°–105° C., first in one direction and thereafter in a second direction perpendicular to the first direction to an extent such that the final film thickness is approximately one-ninth of the thickness of the film prior to stretching, the film being stretched to about 2.5X, where X is the original dimension of the film, in the first direction, and to about 3.7X in the second direction.

5. A process for forming biaxially oriented, heat-shrinkable polyethylene terephthalate film exhibiting substantially the same degree of shrinkage in both directions of the film which comprises stretching substantially amorphous polyethylene terephthalate film at a temperature within the range of from 70°–105° C., first in one direction and thereafter in a second direction perpendicular to the first direction to an extent such that the final film thickness is approximately one-ninth of the thickness of the film prior to stretching, the film being stretched to about 2.5X, where X is the original dimension of the film, in the first direction, and to about 3.7X in the second direction, and thereafter heat-setting the resulting stretched film at a temperature of from 85°–100° C., while maintaining the film under tension.

References Cited in the file of this patent

UNITED STATES PATENTS

| | | |
|---|---|---|
| 2,465,150 | Dickson | Mar. 22, 1949 |
| 2,597,643 | Izard et al. | May 20, 1952 |
| 2,627,088 | Alles et al. | Feb. 3, 1953 |
| 2,784,456 | Grabenstein | Mar. 12, 1957 |
| 2,804,652 | Balkan | Sept. 3, 1957 |
| 2,812,550 | Chavannes | Nov. 12, 1957 |
| 2,823,421 | Scarlett | Feb. 18, 1958 |